Nov. 25, 1969 R. G. MANKARIOUS 3,480,783

PHOTON COUPLER HAVING RADIALLY-DISPOSED, SERIALLY CONNECTED DIODES ARRANGED AS SEGMENTS OF A CIRCLE

Filed Aug. 1, 1966 2 Sheets-Sheet 1

INVENTOR.

Ramzy G. Mankarious,

BY W. H. MacAllister Jr.

ATTORNEY.

PHOTON COUPLER HAVING RADIALLY-DISPOSED, SERIALLY CONNECTED DIODES ARRANGED AS SEGMENTS OF A CIRCLE

Filed Aug. 1, 1966 2 Sheets-Sheet 2

INVENTOR.
Ramzy G. Mankarious,
BY W. H. MacAllister Jr
ATTORNEY 3,480,783

PHOTON COUPLER HAVING RADIALLY-DISPOSED, SERIALLY CONNECTED DIODES ARRANGED AS SEGMENTS OF A CIRCLE

Ramzy G. Mankarious, Costa Mesa, Calif., assignor to Hughes Aircraft Company, Culver City, Calif., a corporation of Delaware Filed Aug. 1, 1966, Ser. No. 569,285
Int. Cl. H01j 39/12
U.S. Cl. 250—211 2 Claims

ABSTRACT OF THE DISCLOSURE

A photon coupler having a plurality of light emitting diodes arranged in radially-disposed segments with the segments being serially connected. A glass substrate separates the light emitting diodes from a light-responsive diode.

This invention relates to electrical and electronic apparatus and devices, and particularly to means for coupling electrical circuits or apparatus so that electrical signals may be transferred therebetween without direct electrical connections. Stated another way, the invention relates to the transfer of an electrical signal from one point to another without necessitating a continuous electrically conductive path.

The need for such an electrical signal transfer mechanism is apparent in applications and apparatus requiring isolation of high and low voltage apparatuses or devices which must nevertheless electrically co-act with each other to produce or obtain a desired result or function. Thus, it is desirable that signals, for example, from a low voltage apparatus be supplied to a high voltage apparatus in such a manner that this transfer is electrically efficient while isolating the low voltage apparatus from the high voltage of the recipient apparatus. Such a scheme is desirable, for example, in applications involving RF transformers having a flat frequency response from DC to MC range; it is also a desideratum for achieving stability in DC circuits and fast switching isolation.

Such isolation may be achieved according to the present invention by converting the electrical signal into light which is transmitted through an electrically insulating, optically transparent medium to a detector whose characteristics are so affected by the light that it provides an output electrical signal that is a replica of the original signal. In this manner, the signal can be coupled to the high voltage apparatus through an optical link which serves to isolate the high voltage. More particularly, the coupling system of the invention comprises a light-emitting member in the form of a plurality of forward biased junction diodes in combination with a reversed biased PIN diode which functions as the detector. The light-emitting junction diodes emit light in accordance with an applied electrical signal, the light varying linearly with the forward current to a first order approximation. The reverse saturation current of the PIN diode increases linearly with illumination again to a first order approximation to thereby regenerate the original electrical signal. The present invention utilizes light-emitting GaAs junction diodes as the light emitter and a PIN silicon diode as the detector in a very efficient manner with superior electrical isolation. The arrangements of the prior art provided either high voltage isolation or high efficiency coupling, but not both.

According to the invention, electrical interference is controlled while maximizing the coupling efficiency and electrical isolation by combining the emitter and detector sections and encapsulating the joined combination in an opaque package. By the invention, light is directly coupled between the emitter and detector sections across a thin transparent homogeneous medium of glass, for example. The coupling medium has an index of refraction matching as nearly as possible the refraction indices of gallium arsenide and silicon. The diodes are directly fused to the coupling medium which enhances the coupling efficiency.

It is therefore an object of the present invention to provide an improved light-coupled semiconductor apparatus.

Another object of the invention is to provide an improved light-coupled semiconductor apparatus in which semiconductor devices of different semiconductor materials having dissimilar physical properties are directly bonded together by an intervening electrically insulating, optically transparent substrate.

Another object of the invention is to provide an improved light-coupled semiconductor apparatus in which a plurality of GaAs diodes are optically coupled to a silicon diode through an intervening electrically insulating, optically transparent substrate to which the diodes are directly bonded.

These and other objects and advantages of the invention are realized by employing a common light-coupling substrate for a plurality of series-connected light-emitting diodes and a light-detecting or responsive diode which substrate is of glass having a co-efficient of expansion intermediate the expansion co-efficients of Si and GaAs and which glass has a high softening or working temperature. The glass employed also has a high dielectric strength which permits it to withstand high electric field stress without breaking down. By properly tailoring the thickness of the glass substrate, the problem of obtaining high coupling efficiency is minimized. The light-coupled apparatus of the present invention also is a rugged and sturdy unit.

The invention will be described in greater detail by reference to the drawings in which.

Figure 1:
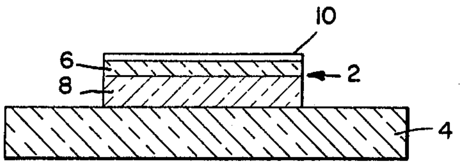
FIGURE 1 is a cross-sectional elevational view of a light-emitting semiconductor apparatus for use in the invention at one stage in the fabrication thereof.
Figure 2:
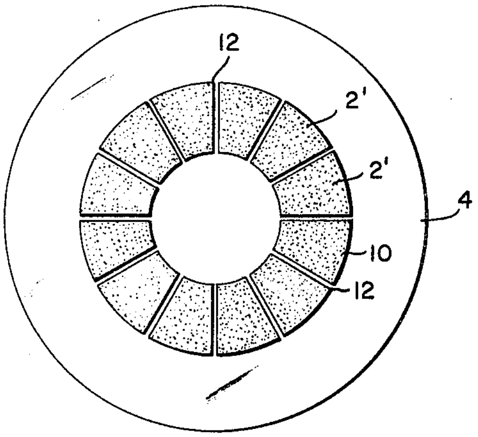
FIGURE 2 is a plan view of the light-emitting semiconductor apparatus shown in FIGURE 1 at a further stage in the fabrication thereof.

Referring now to FIGURE 1, a square chip or wafer 2 of GaAs is shown fused to a glass substrate 4 which has previously been precut to an appropriate size and polished. GaAs is used herein to form the light-emissive diodes of the invention. The fusion of the GaAs wafer 2 to the substrate 4 may be accomplished by heating the substrate and the GaAs wafer to a temperature of about 560° C. at which temperature the glass softens and bonds to the die 2. The GaAs dies may have been previously subjected to a diffusion process in which an upper portion 6 is caused to have a different type of conductivity than the type of conductivity of the GaAs chip prior to such diffusion. Thus the upper portion 6 of the GaAs die 2 may be of P-type conductivity while the lower portion 8 is of N-type conductivity. The establishment of such regions of different or opposite conductivity types by fusion is well-known in the industry and need not be described in greater detail herein. After forming the diffused region 6 in the wafer 2, a layer of wax 10 may then be applied as by evaporation over the top surface of the GaAs wafer. As shown in FIGURE 2, portions of the wax are next removed so that by a subsequent etching operation a plurality of discrete GaAs diode bodies 2′ are formed and which underlie the remaining wax. The discrete diode bodies 2′ may be disposed in a circular array as shown. It will thus be understood that the wax mask 10 was removed so as to expose a central portion of the GaAs chip 2 as well as the peripheral corner portions of the chip. In addition, the wax mask 10 was removed to expose spoke-like portions 12 of the underlying GaAs chip. In this manner, a plurality of discrete circular-disposed GaAs diode bodies are formed and remain fused to the glass substrate 4.

Figure 3:
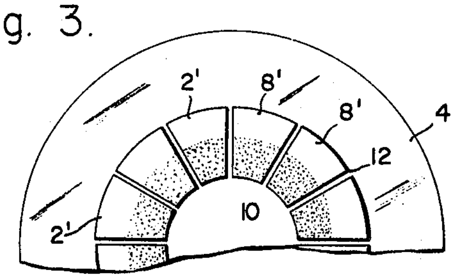
FIGURE 3 is a plan view of a portion of the light-emitting semiconductor apparatus shown in FIGURE 2 at a further stage in the fabrication thereof.
Figure 4:
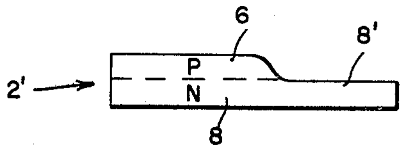
FIGURE 4 is a cross-sectional elevational view of a single light-emitting diode for use in the apparatus of the invention.

Referring now to FIGURE 3, outside peripheral portions of the wax mask 10 are removed so as to expose similar portions of the GaAs diode bodies 2′. By a further etching process, the exposed P-type portions of the diode bodies 2′ are removed so as to expose the underlying N-type regions 8′. As shown in cross-section in FIGURE 4, each GaAs diode body 2′ will appear as a mesa-like body in which the mesa portion 6 is of P-type conductivity, there being an exposed N-type projection 8′ integral with the N-type region 8.

Figures 5, 6:
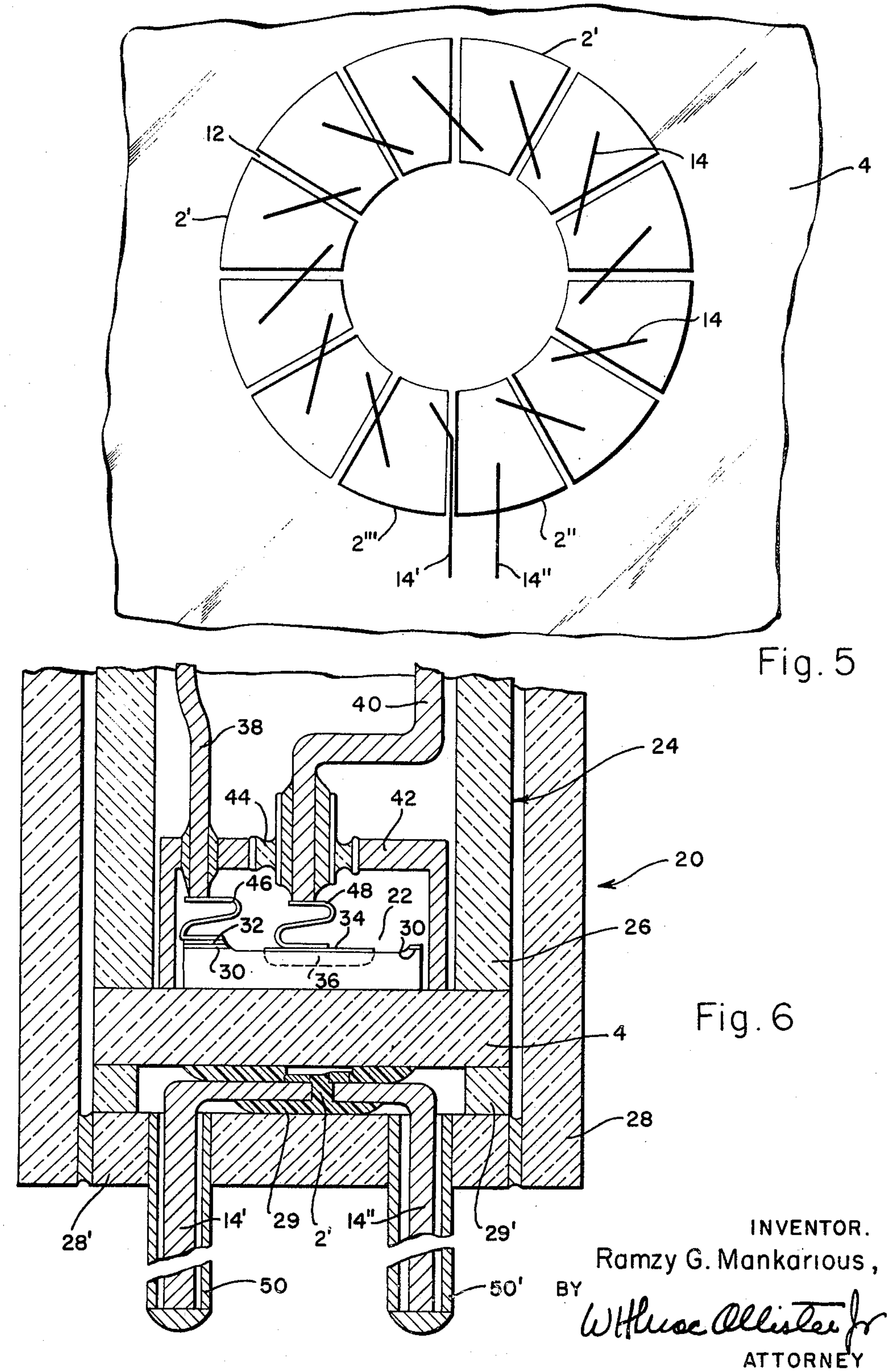
FIGURE 5 is a plan view of the completely fabricated light-emitting semiconductor apparatus shown in FIGURES 1–3.
FIGURE 6 is a cross-sectional elevational view of a light-coupled semiconductor apparatus according to the invention.

The final step in forming the light-emitting section of the apparatus of the present invention is to connect the plurality of GaAs light-emitting diodes 2′ in series. This may be achieved by first providing the upper surfaces of the diodes with an electrically insulating coating, which may be of glass, for example. Openings are then made in the coating so as to expose small portions of each of the P- and N-types regions 6 and 8′, respectively. By masking and metal-evaporation techniques, leads 14 may be formed so as to connect the N-type region 8′ of one diode to the P-type region 8 of an adjacent diode, the connections being successively provided around the array so that the diodes are connected to each other in series-fashion. It is also possible to provide these leads by evaporating tin on preselected surfaces of the P- and N-type regions of each diode after masking small areas thereof around and including the P-N junctions. A slow heating of the evaporated tin film at a temperature slightly below the melting temperature of tin will result in bonding the tin to the respective portions of each GaAs diode forming discrete ohmic contacts to the P- and N-type regions thereof. The diodes may then be connected in series by means of a gold wire bonded to the tin contact on an N-type region and to the tin contact on a P-region of an adjacent diode. As shown in FIGURE 5, two adjacent diodes 2″ and 2‴ are connected somewhat differently in order to provide external connections to the array. This is achieved by simply bringing one lead 14″ out from the P-region of one diode 2″ and not making any further connections to this P-region and by bringing a lead 14′ from the N-region of the adjacent diode 2‴ without making any further connections to this N-region. It may then be desirable to pour a plastic or resin material over the diodes and their leads to secure them mechanically. A suitable resin for this purpose is epoxy whose use for such purposes is well-known in the industry.

In order to avoid the possibility of electrically discontinuous connections between adjacent diodes due to the spoke-like gaps or chasms therebetween extending down to the underlying substrate 4, it is advisable to fill in these spoke-like regions by means of an epoxy or other suitable insulating member prior to forming the contacts between the diodes. Any excess of such filler material which might remain on the upper surfaces of the diodes is readily removable by a soft lapping procedure. It is also possible to utilize glass frit to fill the chasms between the diodes, any excess of which may also be lapped off. It will be appreciated that the filling of the spokes between the diodes may be accomplished at any time after the diodes have been formed into discrete units.

Referring now to FIGURE 6, a photo-coupling device 20 according to the invention is shown in which a light-sensitive diode 22 such as a silicon PIN diode is mounted on one surface of the glass substrate member 4 to which the diode light-emitting array 2′ is bonded on the opposite surface thereof in such a manner that the light emitted by the diode array 2′ in operation is transmitted through the glass substrate member 4 to the light-sensitive diode 22 where it is detected and translated into an electrical signal proportional to that applied to the light emitter diodes 2′.

The glass substrate member 4 may be in the form of a circular wafer cut from a glass plate about 0.050 inch thick of a glass identified as Corning 7052 or 7059 by the manufacturer thereof (Corning Glass Works, Corning, N.Y.). The circular wafers or substrates 4 may then be fused and bonded to precut glass tubes of a similar glass. In this manner, a glass cup 24 is formed consisting of the device-supporting substrate 4 and the tubular wall-forming portion 26. Advantageously, this cup assembly may be fabricated prior to forming the diode array 2′ on the bottom thereof.

It will be understood that at this stage of fabrication and packaging, the light-emitting diode array 2′ is bonded to glass substrate 4 and is disposed externally of the glass cup member 24 on what is now the bottom thereof. The two connection leads 14′ and 14″ of the GaAs diode array 2′ are provided with right angle bends near the ends thereof and, as shown in the drawings, are arranged so as to extend away from the glass substrate member 4 in a direction parallel to the major axis of the glass cup member 24. As suggested previously, good mechanical support for these connections may be provided by applying a resin 29 such as an epoxy on the diode array 2′ as well as on the end portions of the leads and bonding the resin thereto.

The sub-assembly comprising the diode array 2′ and the cup assembly 24 is placed inside a cylindrical ceramic package 28 which at this stage in assembly has an open and a closed end. The closed end comprises a ceramic end cap portion 28′ which is sealed to the cylindrical portion 28 of the package. The ceramic end cap portion 28′ is provided with a pair of holes to permit the passage therethrough of leads to the diode array 2′. The glass cup 24 may be bonded in place inside the ceramic package 28 by means of a suitable glass or resin (such as epoxy) designated by reference number 29′ in the drawings. The two resin-mounting procedures described may be accomplished simultaneously so that the resins are cured at the same time.

The silicon diode 22 is prepared by conventional treatments comprising polishing and etch cleaning a square die of P-type silicon. Although the present invention is described herein as being fabricated by first forming and mounting the GaAs diode array 2′ on the glass substrate 4, there is no significance in the order of fabricating and mounting the two diode systems. The diode system which is first processed should be masked or protected during the processing of the other. Hence, in the present instance it will be understood that the following process steps for forming the silicon diode 22 are performed with the diode array 2′ suitably masked. Thus, the GaAs diode array may be satisfactorily protected by the resin 29.

Prior to mounting the P-type silicon die on the glass substrate member 4, the die is subjected to a diffusion operation in which an N-type impurity such as phosphorous is diffused into the silicon die to form an N-type region 30 extending into the die to a depth of about 0.5 micron. The silicon die is then fused to the side of the glass substrate 4 opposite to that on which the GaAs diode array 2′ is mounted by heating the die and the subassembly to a temperature of about 650° C., for example. It may be desirable to fuse both diode systems to the substrate member at the same time with a single heating operation and then proceed to process one to completion after masking one diode system as mentioned hereinbefore. After bonding to the glass substrate 4, the silicon die is masked, leaving a centrally disposed open portion of considerable extent. This exposed portion of the Si die is then etched to remove a portion of the silicon surface to a depth below the phosphorous diffusion region so as to leave at least on one portion of the periphery thereof a relatively large N-type land or annular mesea region 30' for an electical contact. Thereafter, aluminum contact regions 32 and 34 are formed by evaporating aluminum through a suitable mask. The aluminum contact region 32 will be provided on the land area 30' and thus in electrical contact with the N-type region 30 and 30' of the silicon diode 22. The aluminum contact member 34 is provided on the etched-out portion of the silicon body to be in contact with and establish by fusion therewith a P-type region 36 thereunder.

The next step is to provide a lead and shield sub-assembly for the light-detecting diode 22. This sub-assembly consists of the lead members 38 and 40 and an inverted cup shield 42. The shield member 42 consists essentially of a circular cup formed of a metal such as nickel, for example. The bottom or end portion of this shield 42 is provided with a pair of openings through which the lead members 38 and 40 may be inserted and mounted, it being necessary to insulate one of the lead members (i.e., lead 40) from electrical contact with the shield member. Also, since one of the aluminum contact regions (contact region 34 in the drawings, for example) is centrally disposed on the silicon diode 22, the lead member 40 therefor is provided with two right angle bends in order to bring the end of this lead member through the shield member 42 in a position substantially co-axial with the contact portion 34. As shown, the lead member 38 which is intended to provide the electrical connection to the land or annular mesa portion 30' on the periphery of the diode may be inserted through one of the holes in the shield member 42 and directly soldered thereto. The other lead member 40 extends through the centrally disposed region in the shield 42 and is secured thereto and electrically insulated therefrom by means of a fused glass fillet 44. Both ends of the lead members 38 and 40 which extend through the bottom of the shield cup 42 are provided with S-shaped contact springs 46 and 48. This sub-assembly comprising the shield member 42 and the leads 38 and 40 is brought down within the glass cup member 24 so that the S-shaped contents 46 and 48 contact respectively the aluminum contact regions 32 and 34, the S-shaped spring contacts 46 and 48 being compressed by about 3 mils when mounted.

A ceramic end cap member (not shown) having a pair of holes therein is then fused or bonded into the open end of the ceramic cylinder 18 with the lead members 38 and 40 extending therethrough. The end cap member may be hermetically sealed to the ceramic package by means of a tin-lead solder, for example. It may be desirable to enhance the high dielectric breakdown characteristics of the device by filling it with a gas having a high dielectric breakdown such as $CF_4$. The external lead for both diode systems may be inserted into respective tubular-like leads or prongs 50 and 50' which extend from opposite ends of the package 28. The rugged prong-like leads may be crimped around the lead members and hermetically welded or sealed by means of a percussive arc welder with the space between the leads and the tubes being filled by metal or solder as shown in connection with the leads 14' and 14'' for the light-emitting diode array.

It will thus be understood that a relatively rugged coupling device is provided. In practice, it has been found that the devices of the present invention will couple signals non-electrically and efficiently across voltages as high as 13 kv. Furthermore, the device of the present invention may be and has been used continuously without degradation at high voltage. The emitter, detector and coupling elements form a solid, sturdy block that has been found to be entirely reliable under severe conditions of temperature and electrical stress.

With a photo coupler according to the invention it is possible to realize a significant gain in the coupling efficiency without limiting the frequency response and without increasing the external circuit elements. In addition, the same output current from the detector diode may be realized with a decrease in the input current in comparison with photon couplers in which a single light-emitting diode is employed. This latter feature is especially useful where it is desirable to couple high frequency signals which would have to be considerably amplified in order to reach a level of 100 ma. Also, by the apparatus of the invention, the AC source power is limited to the $I^2R$ dissipation in the diode array series resistance. The bulk of the power required for diode operation may be provided by a DC source which permits the AC signal to be reduced considerably for the same detector output. This means that more detector current is available for the same input current. In arrays where as many as 20 light-emitting diodes are employed, the current will be reduced by twenty times, and what previously took 150 ma. to deliver 0.5 ma. on the output will now only take 7.5 ma. representing a considerable saving in AC power.

Another advantage in the configuration of the invention is that the same total amount of input power to a single light-emitting diode can now be distributed over a plurality of diodes. Thus the power is no longer concentrated in one small area but rather is distributed over a considerably larger area. Measurements have shown that the input power capability of apparatus according to the invention is increased about threefold. Apparatus according to the invention is capable of handling about 20 ma. with a resultant 300% increase in light output for that input current. In comparison with prior art photon coupler arrangements, a 200 ma. input current could be handled at 1.2 volts forward drop which amounts to about 240 mw. It is also possible to operate two couplers according to the present invention connected in series and still get an appreciable output. This is particularly useful in applications requiring 20 to 25 kv. isolation.

There thus has been shown and described a coupling device which permits the achievement of a superior electrical isolation with coupling that is broad band requiring low input current and which is more efficient than previous devices from an AC standpoint. In addition, voltage and power gain can be easily achieved by inserting a high resistance lead in the output circuit that permits the device to function as an amplifier.

What is claimed is:

1. Semiconductor apparatus for coupling an input electrical signal to electrical apparatus by means of an electrically isolating optical path comprising:

a plurality of light-emitting gallium arsenide diodes, said diodes being radially-disposed segments of a circle;

means for serially-connecting said light-emitting diodes;

electrical leads connected to said light-emitting diodes for applying an input electrical signal thereto;

a silicon light-sensitive diode device capable of developing an output electrical signal corresponding to said input electrical signal in response to light rereived thereby from said light-emitting diodes;

electrical leads connected to said light-sensitive diode device and extending in an opposite direction to that from which said electrical leads for said light-emitting diodes extend;

an optically transmissive, electrically insulating support member on opposite sides of which said silicon diode device and said gallium arsenide diodes are fixedly bonded so as to transmit therethrough the light emitted by said gallium arsenide diodes;

said support member having a coefficient of thermal expansion intermediate the expansion coefficients of gallium arsenide and silicon;

a hermetically sealed electrically insulating container in which said gallium arsenide diodes, said silicon diode and said support member therefor are disposed, said electrical leads extending through predetermined portions of said container; and a gas having a high dielectric breakdown filling said container.

2. The apparatus of claim 1 wherein each gallium arsenide diode comprises a mesa-like body having the mesa portion of P-type conductivity; and an exposed N-type projection integral with the N-type region of said gallium arsenide diode.

References Cited

UNITED STATES PATENTS

| | | | |
|---|---|---|---|
| 3,153,149 | 10/1964 | Finigian | 250—239 |
| 3,304,430 | 2/1967 | Biard et al. | 250—211 |
| 3,346,811 | 10/1967 | Perry et al. | 250—227 X |
| 3,354,316 | 11/1967 | Deverall | 250—239 X |
| 3,358,146 | 12/1967 | Ing et al. | 250—213 |

OTHER REFERENCES

Dill, Jr., F. H.: Light Emitting Device With a Quantum Efficiency Greater Than Unity, IBM Technical Disclosure Bulletin, vol. 6, No. 2, pp. 84–85, July 1963.

Hoogendoorn et al.: Glass for Use on Gallium Arsenide Devices, IBM Technical Disclosure Bulletin, vol. 8, No. 1, p. 3, June 1965.

RALPH G. NILSON, Primary Examiner

T. N. GRIGSBY, Assistant Examiner

U.S. Cl. X.R.

250—217, 239; 317—235